United States Patent
Soni et al.

(10) Patent No.: US 11,068,574 B2
(45) Date of Patent: *Jul. 20, 2021

(54) PHONE FACTOR AUTHENTICATION

(71) Applicant: VMware, Inc., Palo Alto, CA (US)

(72) Inventors: Abhishek Soni, San Jose, CA (US); Lakshman Rao Abburi, Pleasanton, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,996

(22) Filed: May 17, 2019

(65) Prior Publication Data
US 2019/0274043 A1 Sep. 5, 2019

Related U.S. Application Data

(63) Continuation of application No. 15/260,123, filed on Sep. 8, 2016, now Pat. No. 10,334,434.

(51) Int. Cl.
*G06F 21/34* (2013.01)
*H04L 29/06* (2006.01)
(Continued)

(52) U.S. Cl.
CPC .......... *G06F 21/34* (2013.01); *H04L 63/0853* (2013.01); *H04L 63/18* (2013.01);
(Continued)

(58) Field of Classification Search
CPC ......... H04W 12/06; H04W 4/80; G06F 21/34; G06F 21/629; H04L 63/0853; H04L 63/18
See application file for complete search history.

(56) References Cited

U.S. PATENT DOCUMENTS 7,624,432 B2 * 11/2009 Wood .................... G06F 21/335
713/163
8,042,160 B1 * 10/2011 Boydstun ............ G06F 21/6218
726/6
(Continued)

OTHER PUBLICATIONS

Fujii et al "SV-2FA: Two Factor User Authentication with SMS and Voiceprint Challenge Response," The 8th International Conference for Internet Technology and Secured Transactions, (ICITST—2013), pp. 283-287 (Year: 2013).*

(Continued)

*Primary Examiner* — Luu T Pham
*Assistant Examiner* — James J Wilcox
(74) *Attorney, Agent, or Firm* — Fish & Richardson P.C.

(57) ABSTRACT

Systems and techniques are described for authenticating a user. A described technique includes receiving, by an identity management application running on a user computer, a request to authenticate a user to access a user application using the user computer. The technique includes determining, by the identity management application, that a mobile device associated with the user is connected to the user computer using a short distance wireless connection. The technique includes requesting, by the identity management application running on the user computer, authentication information for the user from the mobile device over the short distance wireless connection. The technique includes receiving, by the identity management application running on the user computer, the authentication information for the user from the mobile device over the short distance wireless connection. In response to receiving the authentication information, the technique includes authenticating the user to access the user application using the user computer.

18 Claims, 4 Drawing Sheets

(51) Int. Cl.
  *H04W 12/065* (2021.01)
  *H04W 12/069* (2021.01)
  *G06F 21/62* (2013.01)
  *H04W 4/80* (2018.01)
  *H04W 12/06* (2021.01)

(52) U.S. Cl.
  CPC ....... *H04W 12/065* (2021.01); *H04W 12/068* (2021.01); *H04W 12/069* (2021.01); *G06F 21/629* (2013.01); *H04W 4/80* (2018.02)

(56) References Cited

U.S. PATENT DOCUMENTS

| | | | |
|---|---|---|---|
| 8,402,509 B2* | 3/2013 | Yang | H04L 9/32 726/2 |
| 8,625,796 B1* | 1/2014 | Ben Ayed | H04W 12/068 380/258 |
| 9,317,985 B2 | 4/2016 | Tehranchi et al. | |
| 9,495,533 B2 | 11/2016 | Yiu et al. | |
| 9,589,405 B2* | 3/2017 | Cabouli | G07C 9/00563 |
| 9,652,771 B2* | 5/2017 | Fisher | G06Q 20/401 |
| 9,701,280 B2* | 7/2017 | Schussmann | H04W 4/80 |
| 9,774,575 B2* | 9/2017 | Kim | H04L 63/0853 |
| 10,341,311 B2 | 7/2019 | Smith et al. | |
| 2004/0059953 A1* | 3/2004 | Purnell | G06F 21/34 726/6 |
| 2006/0005011 A1* | 1/2006 | Satoh | G06F 21/33 713/156 |
| 2007/0143829 A1 | 6/2007 | Hinton et al. | |
| 2008/0098484 A1* | 4/2008 | Cicchitto | H04L 63/101 726/27 |
| 2008/0249947 A1* | 10/2008 | Potter | G06F 21/31 705/67 |
| 2009/0126007 A1 | 5/2009 | Zamberlan et al. | |
| 2011/0047608 A1 | 2/2011 | Levenberg | |
| 2011/0086616 A1* | 4/2011 | Brand | G06Q 20/425 455/411 |
| 2011/0159846 A1* | 6/2011 | Kemshall | H04W 12/0608 455/411 |
| 2011/0246757 A1* | 10/2011 | Prakash | G06F 21/305 713/2 |
| 2011/0289567 A1 | 11/2011 | Bauer-Hermann et al. | |
| 2012/0137128 A1 | 5/2012 | Buer | |
| 2012/0166337 A1 | 6/2012 | Park et al. | |
| 2012/0204245 A1* | 8/2012 | Ting | H04L 9/3228 726/6 |
| 2012/0317194 A1 | 12/2012 | Tian et al. | |
| 2012/0323717 A1* | 12/2012 | Kirsch | G06F 21/31 705/26.1 |
| 2013/0024221 A1 | 1/2013 | Fisher | |
| 2013/0035970 A1* | 2/2013 | Fisher | H04W 12/062 705/5 |
| 2013/0036458 A1* | 2/2013 | Liberman | G06F 21/31 726/6 |
| 2013/0160078 A1* | 6/2013 | Yang | H04L 9/32 726/2 |
| 2013/0262857 A1 | 10/2013 | Neuman et al. | |
| 2014/0109177 A1* | 4/2014 | Barton | H04L 63/205 726/1 |
| 2014/0189831 A1* | 7/2014 | Kemshall | H04L 9/088 726/6 |
| 2014/0189834 A1* | 7/2014 | Metke | H04W 12/069 726/7 |
| 2014/0189840 A1* | 7/2014 | Metke | H04L 63/0884 726/9 |
| 2014/0337956 A1* | 11/2014 | Korgaonkar | H04L 63/0853 726/9 |
| 2014/0342726 A1* | 11/2014 | Smereka | H04W 4/50 455/420 |
| 2015/0020148 A1 | 1/2015 | Greenbaum et al. | |
| 2015/0089568 A1* | 3/2015 | Sprague | H04L 63/06 726/1 |
| 2015/0163672 A1* | 6/2015 | Jin | H04W 12/06 726/3 |
| 2015/0169672 A1* | 6/2015 | Dennis | H04L 41/5077 707/736 |
| 2015/0172139 A1* | 6/2015 | Dennis | G06F 16/254 709/223 |
| 2015/0172920 A1* | 6/2015 | Ben Ayed | H04L 63/0492 713/172 |
| 2015/0188891 A1* | 7/2015 | Grange | H04L 63/083 380/270 |
| 2015/0269800 A1 | 9/2015 | Tehranchi et al. | |
| 2015/0281227 A1* | 10/2015 | Fox Ivey | H04L 63/083 713/168 |
| 2015/0358331 A1* | 12/2015 | Rachalwar | H04L 63/102 726/7 |
| 2016/0019737 A1* | 1/2016 | Stagg | H04W 4/80 340/5.61 |
| 2016/0080343 A1 | 3/2016 | Robinton | |
| 2016/0094531 A1* | 3/2016 | Unnikrishnan | G06F 21/30 726/7 |
| 2016/0241544 A1 | 8/2016 | Guo et al. | |
| 2016/0330178 A1* | 11/2016 | Sprague | H04L 63/06 |
| 2017/0124307 A1* | 5/2017 | Reitsma | G06F 3/0481 |
| 2017/0134372 A1* | 5/2017 | Dube | G06K 9/4652 |
| 2018/0070233 A1 | 3/2018 | Soni et al. | |
| 2020/0304990 A1* | 9/2020 | Azam | H04W 12/69 |

OTHER PUBLICATIONS

Eldefrawy et al "OTP-Based Two Factor Authentication Using Mobile Phones," 2011 Eighth International Conference on Information Technology: New Generations, pp. 327-331 (Year: 2011).*
Aloul et al "Multi Factor Authentication Using Mobile Phones," Jul. 22, 2009, International Journal of Mathematics and Computer Science, pp. 65-80 (Year: 2009).*
Laukkanen-Towards Operating Identity-based NFC Services, 2007, IEEE, pp. 92-95, 4 pages.
Lu-An NFC-Phone Mutual Authentication Scheme for Smart-Living Applications, 2014, IEEE, pp. 1053-, 5 pages.

* cited by examiner

PHONE FACTOR AUTHENTICATION

CROSS REFERENCE TO RELATED APPLICATION

This application is a continuation application of U.S. patent application Ser. No. 15/260,123, filed on Sep. 8, 2016, which is incorporated herein in its entirety.

BACKGROUND

This document relates to authentication on behalf of a user by the user's mobile device.

Identity management is the task of controlling information about users on computers, including information that authenticates the identity of a user and information that describes data and actions they are authorized to access and/or perform.

SUMMARY

In general, one aspect of the subject matter described in this document can be embodied in a technique that includes receiving, by an identity management application running on a user computer, a request to authenticate a user to access a user application using the user computer, determining, by the identity management application running on the user computer, that a mobile device associated with the user is connected to the user computer using a short distance wireless connection, requesting, by the identity management application running on the user computer, authentication information for the user from the mobile device over the short distance wireless connection, receiving, by the identity management application running on the user computer, the authentication information for the user from the mobile device over the short distance wireless connection, and in response to receiving the authentication information, authenticating the user to access the user application using the user computer.

These and other aspects can optionally include one or more of the following features. Aspects can include determining, by the identity management application running on the user computer, that the mobile device is no longer connected to the user computer using the short distance wireless connection, and in response, revoking the authentication for the user to access the user application using the user computer. In some implementations, the short distance wireless connection can only be established between devices within a predetermined distance of each other.

In some implementations, the determining, the requesting, the receiving, and the authenticating occur automatically in response to receiving the request to authenticate the user to access the user application using the user computer. In some implementations, the authentication information can only be used to authenticate the user once.

Aspects can include receiving, by the mobile device, the request for authentication information from the user device over the short distance wireless connection, and in response to the request: providing credentials for the user to an identity management system, receiving the authentication information from the identity management system in response to providing the credentials, and providing the authentication information to the user device over the short distance wireless connection. Aspects can further include receiving, by the identity management system, a request to authenticate the user, determining, by the identity management system, that mobile authentication is available for the request to authenticate the user, and providing a challenge to the user device for credentials from the mobile device.

Aspects can additionally include providing the authentication information to the identity management system in response to the challenge or causing the authentication information to be provided to the identity management system in response to the challenge. Aspects can further include receiving, by the identity management system, the credentials from the mobile device, generating, by the identity management system, the authentication information, and transmitting, by the identity management system, the authentication information to the mobile device.

Particular embodiments of the subject matter described in this document can be implemented so as to realize one or more of the following advantages. A user can experience a seamless authentication to a user application without providing further input to an authentication portal or system. The latency between attempting to access a user application from a remote computer and being granted access to the user application is reduced. The performance of an identity management system can be improved by reducing the need for parsing input from human users.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for authentication of a user on the user's behalf by the user's mobile device.

An identity management system may allow a user to access remotely-stored data or remotely-executing applications using a user device through the user's mobile device. For example, a doctor in a hospital can be authenticated and access a medical application on a computer in a patient's room through his or her smartphone.

In some examples, a setup process is needed before a user can use a mobile device for authentication. For example, an identity management application maybe be installed on a user's mobile device, such as a smartphone, laptop, tablet, etc. In some examples, an administrator may automatically install the application for users under their purview. For example, an IT administrator for a corporation may install the identity management application for their Mobile Device Management (MDM) users.

The process may include registering the user's mobile device as an authorization client with the identity management system. For example, the user may register their smartphone as an authorization client with the identity management system. In some examples, the registration of the user's mobile device is automated. For example, an IT administrator could automatically register their organization's MDM users' mobile devices as authorization clients with the identity management system.

The process may include the user enabling their mobile device and the user device to communicate. In some examples, this communication is over a short distance wireless connection. For example, the communication may be through Bluetooth, radio frequency identification (RFID) and subsets of RFID such as near field communication (NFC), etc. Restricting communication over a short distance wireless connection provides increased security by confirming that the user's mobile device, and therefore the user, is physically proximate to the user device.

The process may include an administrator configuring the identity management system policy to allow authentication of users through mobile devices. For example, an IT administrator of a corporation may configure the identity management system policy of their corporation to allow users to be authenticated through their smartphones. In some examples, the administrator may configure the policy to allow certain users or users having certain attributes to be authenticated through mobile devices. For example, an IT administrator at a hospital may configure the policy to only allow doctors and nurses to be authenticated through mobile devices, or only allow staff of a certain department to be authenticated through mobile devices.

Figure 1:
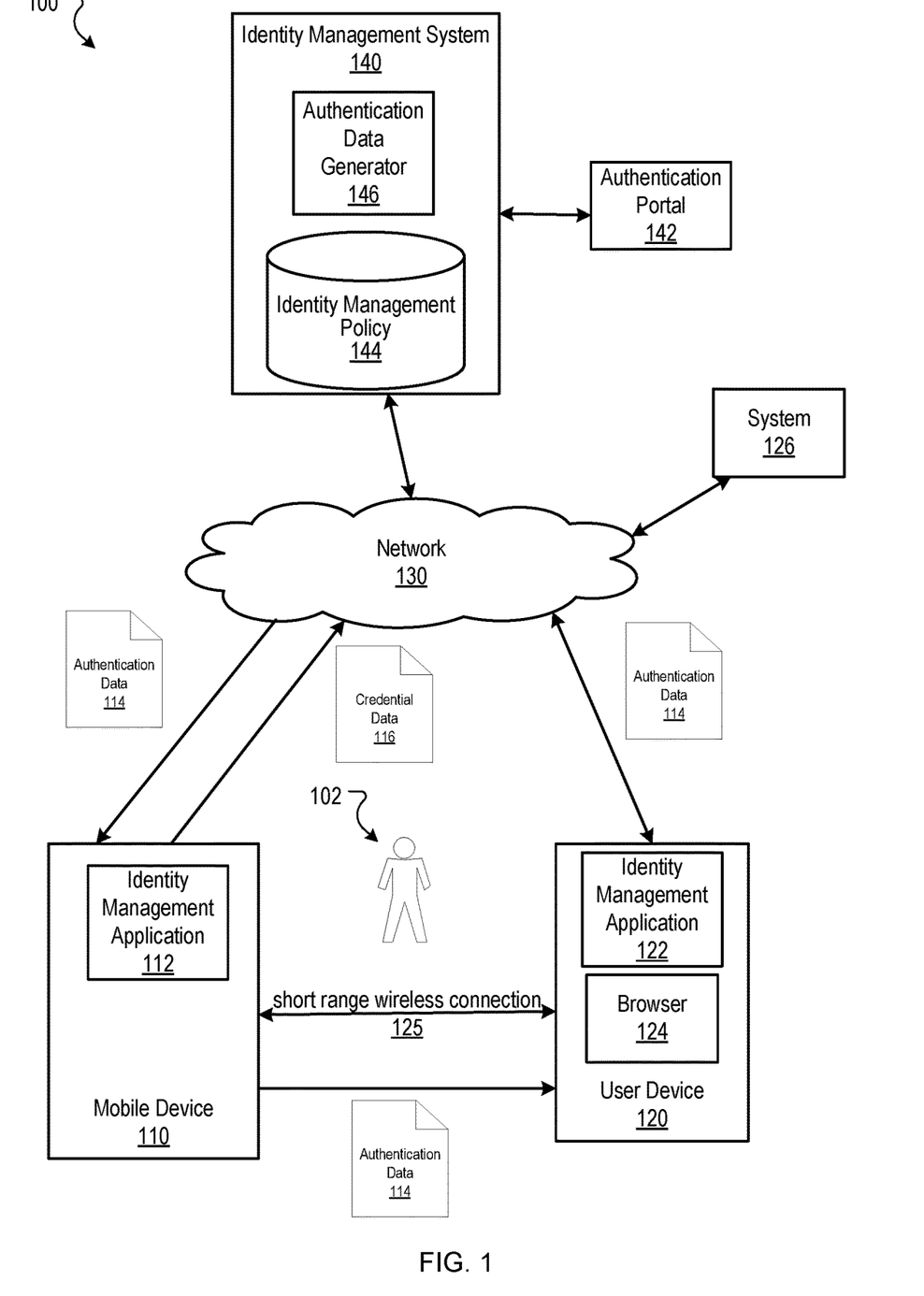
FIG. 1 is a block diagram that shows an example system for authentication on behalf of a user by the user's mobile device.

FIG. 1 shows an example environment 100 in which an identity management system 140 manages authentication of users. The identity management system 140 is an example of a system implemented as computer programs on one or more computers in one or more locations, in which the systems, components, and techniques described below can be implemented.

The identity management system 140 manages authentication for users, such as a user 102, attempting to access resources provided by another system, e.g., a system 126. For example, the identity management system 140 can authenticate the user 102 to allow the user 102 to access to data, applications, desktop environments being remoted in a Virtualized Desktop Infrastructure (VDI) environment, and so on that are managed by the system 126. In some implementations, when a request is received by the system 126 that requires user authentication, the system 126 can redirect the request to the identify management system 140. In some other implementations, the computer through which the request is being submitted to the system 126 can determine that authentication is required, and transmit a request for authentication to the identity management system 140.

The system 126 is a system that the user 102 can access after being authenticated by the identity management system 140. The system 126 is accessible through a user computer, such as the user device 120. In some examples, the system 126 provides applications or virtual desktops to remote users. For example, the system 126 can manage a medical application used by a doctor in a hospital to access patient records for a specific patient. The system 126 can be accessed by the doctor through a computer in the specific patient's room. In another example, the system 126 can manage a virtual desktop used by a particular employee of a corporation. The system 126 can be accessed by the particular employee through any computer in the corporation's building.

The user device 120 can be a computer, e.g., a laptop computer or a tablet computer, or other appropriate electronic device through which the user 102 can access data, applications, or any other resource or service provided by the system for which the identity management system 140 provides authentication services. The user device 120 includes an identity management application 122 and a browser 124.

In some examples, the user device 120 is used by multiple different users at different times to access the system 126, with each user needing to authenticate themselves using their own authentication data. For example, the user device 120 can be a computer in a hospital that can be accessed by doctors, nurses, and patients, each of which have their own authentication data and access privileges.

The browser 124 can be a web browser or other application for retrieving, presenting, and interacting with information resources, or data, through a network such as the Internet. In some examples, the browser 124 can be used to access information provided by servers in private networks or files in distributed file systems. In some examples, information resources are identified by a Uniform Resource Identifier (URI or URL) and can be a web page, image, video, or other content.

The identity management system 140 generally supports multiple authentication mechanisms. For example, the identity management system 140 can support mechanisms such as a username/password combination, two-factor authentication, etc. The identity management system 140 can also support authentication through the use of a mobile device, such as a mobile device 110. For example, the identity management system 140 can authenticate the user 102 through an identity management application 112 running on the mobile device 110 that communicates with an identity management application 122 of the user device 120 over a short range wireless connection 125.

The short range wireless connection 125 can be a connection that can only be established between two devices when the devices are relatively proximate to one another. For example, the short range wireless connection 125 can be a connection that can only be established between the mobile device 110 and the user device 120 when the devices are within a predetermined number of feet of each other, such as two feet, five feet, ten feet, etc. In some examples, the short range wireless connection 125 can be a peer-to-peer connection. In some examples, the short range wireless connection 125 can form simple networks between multiple devices. The short range wireless connection 125 can be done through any of a number of communication methods and/or protocols. For example, the communication may be through Bluetooth, NFC, etc. By limiting communication ranges to short distances, an additional security measure of ensuring that the mobile device 110 of the user 102, and thus the user 102, is within a specified physical proximity of the user device 120 to from which the user 102 is requesting access.

The identity management system 140 communicates with the mobile device 110 and/or the user device 120 through a network 130, e.g., a local area network (LAN), wide area network (WAN), e.g., the Internet, a cellular data network, or a combination thereof.

The mobile device 110 can be a portable computer, e.g., a smartphone, a laptop computer, a tablet computer, or other appropriate mobile electronic device such that a user 102 can transport the mobile device 110 to various locations. The mobile device 110 includes an identity management application 112. The identity management application 112 can communicate with other identity management applications installed on other computing devices and with the identity management system 140.

For example, the identity management system 140 can receive a request for authentication data from the user device 120 or from the system 126 to authenticate the user 102 to access the system 126 using the user device 120 and then communicate with the mobile device 110 to authenticate the user 102.

The mobile device 110 can receive a request from the user device 120 for authentication data for the user 102 over the short range wireless connection 125 and transmit credential data 116 to the identity management system 140 over the network 130. In response, the identity management system 140 provides the authentication data 114 through the network 130 to the mobile device 110.

For example, the mobile device 110 may transmit credential data 116 to the identity management system 140 that authenticates the user 102 to use the system 126. The credential data 116 can be fingerprint data, a voice recording, an iris scan, etc., and confirms the identity of the user 102 using the mobile device 110. In some examples, the credential data 116 is a token that provides a user with a secure delegated access to server resources on behalf of a resource owner. For example, the credential data 116 can be an OAuth 2.0 token. In some examples, the credential data 116 is stored in a memory of the mobile device 110 or generated automatically by the mobile device 110 in response to a request from the user device 120. In some other examples, the data 116 is input to the mobile device 110 by the user 102. For example, the identity management system 140 may request the credential data 116 from the user 102 through the network 130, and the user 102 can respond to the request by inputting, granting access to, or generating the credential data 116.

The identity management system 140 can respond to the credential data 116 by providing the authentication data 114 to the mobile device 110 through the network 130. The authentication data 114 can be a security token, and can store data such as cryptographic keys, a digital signature, etc. For example, the data 114 can be a generated One Time Password (OTP) token that is valid for only one login session or transaction on a computer system or other electronic device.

The identity management system 140 can communicate with the browser 124 on the user device 120 through the network 130. For example, the identity management system 140 can receive requests for data from the browser 124. In some examples, the identity management system 140 communicates with the user device 120 using Hypertext Transfer Protocol (HTTP).

The user 102 can access to an authentication portal 142 through the network 130 that is launched by the identity management system 140.

The identity management system 140 maintains an identity management policy 144. In some examples, the identity management system 140 determines a method of authentication available for the user 102. For example, in response to receiving a request to authenticate the user 102, the identity management system 140 may access the identity management policy 144 and determine that mobile authentication is available to the user 102. The identity management system 140 may determine an appropriate action to take based on the method of authentication selected for the user 102. For example, the identity management system 140 may transmit HTML data to the user device 120 with a challenge for authentication data from the mobile device 110.

The identity management policy 144 defines standards of configuration for the server 140. For example, the policy 144 can include settings for acceptable methods of authentication for particular users, devices, etc. In some examples, the policy 144 defines acceptable values of authentication data. For example, the policy 144 may include data, such as matching passwords, biometrics, etc., that will be found acceptable as authentication for a user if transmitted by the mobile device 110.

The identity management system 140 includes an authentication data generator 146. The authentication data generator 146 can generate authentication data, such as the authentication data 114. In some examples, the authentication data generator 146 generates the authentication data 114 in response to receiving the credential data 116 from the mobile device 110 and determining that the credential data 116 is valid. For example, the authentication data generator 146 can generate the authentication data 114, in this example, a security token, to transmit to the mobile device 110 upon receiving the credential data 116 from the mobile device 110.

Upon receiving the authentication data 114, the mobile device 110 transmits the authentication data 114 to the user device 120 over the short range wireless connection 125. For example, the mobile device 110 can transmit the security token received from the identity management system 140 to the user device 120 over NFC.

Once the user device 120 receives the authentication data 114, the user device 120 can transmit the authentication data 114 to the identity management system 140 to authenticate the user 102. The user 102 can then access the system 126. For example, the user device 120 can transmit the security token received from the mobile device 110 over NFC to the identity management system 140 over the network 130.

The identity management system 140 can determine that the user 102 is authenticated based on receiving the authentication data 114 that it transmitted to the mobile device 110 from the user device 120, because the authentication data 114 is transmitted to the user device 120 over the short range wireless connection 125. The short range wireless connection 125 cannot be established unless the mobile device 110 and the user device 120 are relatively proximate to each other, and the mobile device 110 provides the credential data 114 to the identity management system 140 to authenticate the user 102.

Upon receiving the authentication data 114 from the user device 120, the identity management system 140 can grant access to the system 126 through the user device 120. For example, once the identity management system 140 receives the security token it transmitted to the mobile device 110 from the user device 120, the identity management system 140 can grant the user 102, a doctor, access to a medical application that allows him to check on patient records through the user device 120.

Figure 2:
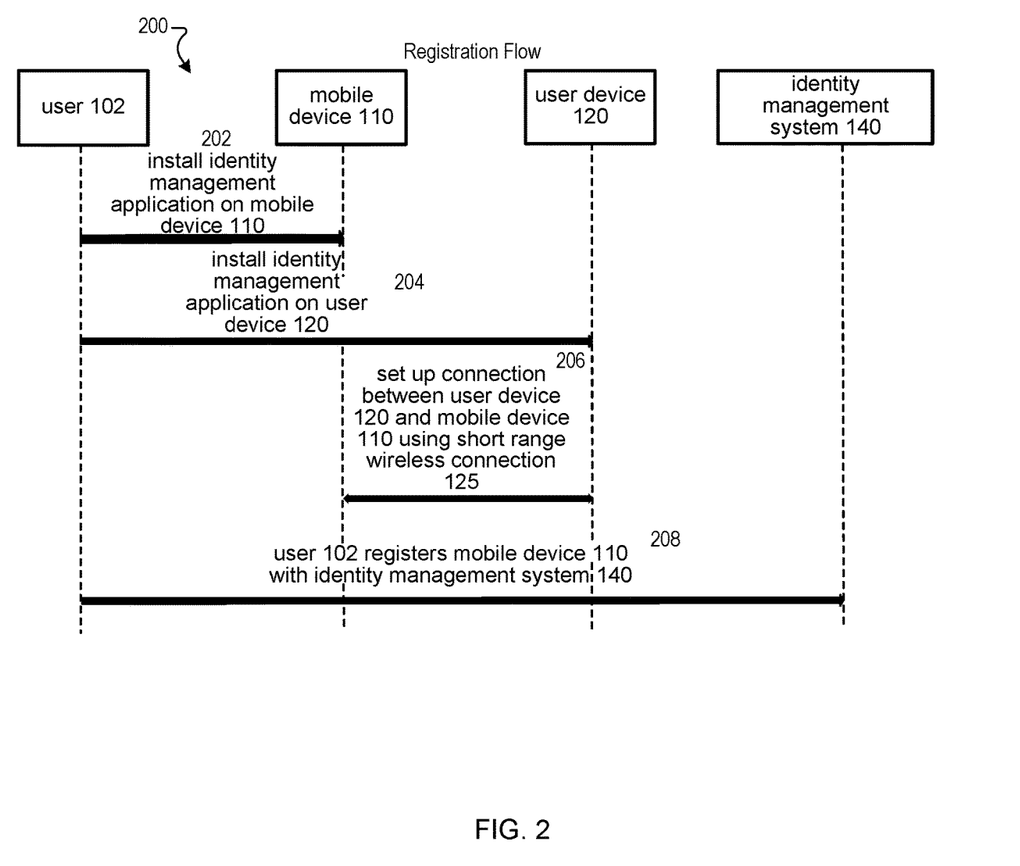
FIG. 2 is a diagram of an example process of registering a user's mobile device with an identity management system for use as an authentication client.

FIG. 2 shows a diagram 200 of an example process in which the mobile device 110 is enrolled for use with the identity management system 140. At step 202, the user 102 or an IT administrator installs the identity management application 112 on the mobile device 110. At step 204, the user 102 or the IT administrator installs the identity management application 122 on the user device 120. Once installed, the identity management application 122 can communicate with the identity management application 112 and the identity management system 140.

At step 206, the short range wireless connection 125 is established between the mobile device 110 and the user device 120. In some examples, the user 102 enables both the mobile device 110 and the device 120 to communicate through the short range wireless connection 125. For example, the user may enable Bluetooth on both the mobile device 110 and on the user device 120 and pair the mobile device 110 and the user device 120 to allow the two devices to communicate over the short range wireless connection 125.

At step 208, the user 102 registers the mobile device 110 with the identity management system 140. The user 102 registers the mobile device 110 as an authorization client with the identity management system 140. In some examples, an IT administrator can automate the registration of the mobile device 110. Once the mobile device 110 is registered, an identity management policy can be configured to allow the use of mobile devices for authentication by the identity management system 140. For example, the mobile device 110 can be a smartphone that allows the user 102 to be authenticated by the identity management system 140 to access the system 126 through the user device 120, which can be a desktop computer or a laptop computer, for example.

Figure 3:
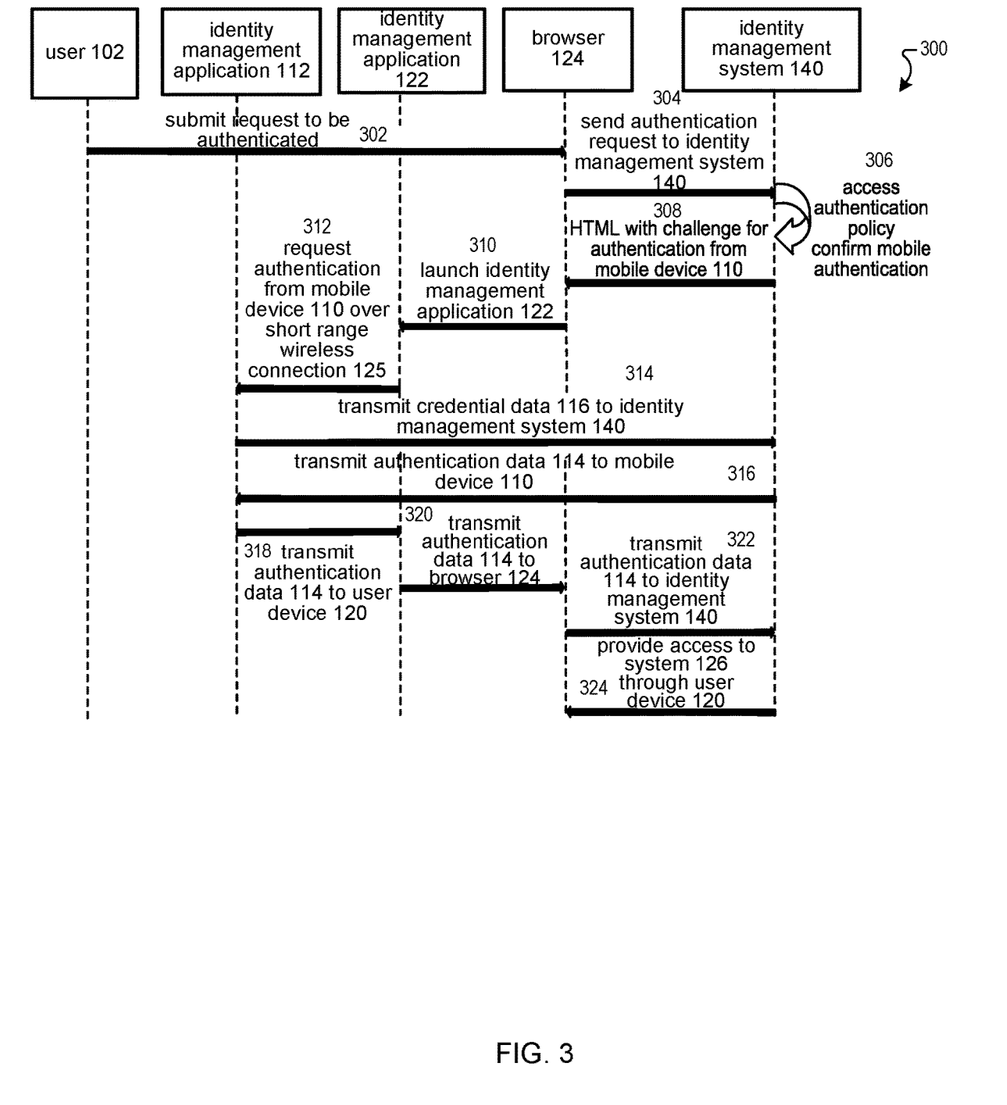
FIG. 3 is a diagram of an example process of authentication on behalf of a user by the user's mobile device.

FIG. 3 shows a diagram 300 of an example process of authentication on behalf of a user by the user's mobile device 110.

At step 302, the user 102 attempts to access the system 126 through the user device 120. In some examples, the user 102 tries to access the system 126 through the browser 124 on the user device 120, or through the authentication portal 142. The attempt to access the system 126 results in a request to the identity management system 140 for authentication of the user 102. In some examples, the identity management system 140 determines that the user 102 needs to be authenticated based on the request for access to the system 126.

At step 304, the browser 124 submits a request for authentication of the user 102 to the identity management system 140. For example, the browser 124 can submit an HTTP request to the identity management system 140. The HTTP request can include a request to access the system 126. In some examples, the HTTP request can be sent automatically by the browser 124 without further action from the user 102.

At step 306, the identity management system 140 accesses an identity management policy, such as the identity management policy 144, to determine whether authentication through a mobile device is permitted. Permissions for mobile authentication can be dependent on many factors. For example, permissions for mobile authentication can be user specific, device specific, system specific, and so on.

At step 308, the identity management system 140 transmits a challenge for authentication data from the mobile device 110 to the browser 124 on the user device 120. In some examples, the challenge is an HTML challenge for a security token, such as an OTP token. The identity management system 140 can transmit the challenge upon determining that mobile authentication is permitted for the access request.

At step 310, the browser 124 on the device 120 launches the identity management application 122 on the user device 120. The launching of the identity management application 122 can be automatic upon receiving the HTML challenge from the identity management system 140.

At step 312, the identity management application 122 on the user device 120 communicates with the identity management application 112 on the mobile device 102 to request authentication data over the short range wireless connection 125. For example, the identity management application 122 can communicate with the identity management application 112 over NFC to request an OTP token. The identity management application 122 can communicate with the identity management application 112 automatically and without input from the user 102.

At step 314, the identity management application 112 on the mobile device 110 authenticates itself with the identity management system 140 by providing the credential data 116 to the identity management system 140. For example, the identity management application 112 can provide valid OAuth2 credentials that match the user 102's identity to the identity management system 140.

At step 316, the identity management system 140 generates authentication data 114, such as an OTP token in response to receiving the credential data 116 provided by the mobile device 110 over the short range wireless connection 125. The identity management system 140 then transmits the authentication data 114 over the network 130 to the mobile device 110. For example, the identity management system 140 can generate an OTP token and transmit the OTP token to the mobile device 110. The identity management system 140 can generate and transmit the authentication data 114 automatically and without input from the user.

At step 318, the identity management application 112 on the mobile device 110 receives the authentication data 114 and presents the authentication data 114 to the identity management application 122 on the user device 120 over the short range wireless connection 125. The identity management application 112 can present the authentication data 114 to the identity management application 122 automatically and without input from the user 102.

At step 320, the identity management application 122 on the user device 120 presents the authentication data 114 received from the identity management application 112 to the browser 124 on the user device 120. For example, the identity management application 122 can receive the OTP token generated by the identity management system 140 and transmitted to the mobile device 110 and provide the OTP token to the browser 124 on the user device 120.

At step 322, the browser 124 transmits the authentication data 114 to the identity management system 140. The authentication data 114 is provided to the identity management system 140 as a response to the challenge presented by the identity management system 140 in step 308. The browser 124 can provide the authentication data 114 to the identity management system 140 automatically and without user input. In some alternative implementations, the identity management 122 transmits the authentication data 114 to the identity management system 140 directly, i.e., without presenting the data 114 to the browser 124 for transmission to the identity management system 140.

At step 324, the identity management system 140 authenticates the user 102 using the authentication data 114 and allows the user 102 access to the system 126. For example, the identity management system 140 can determine, based on receiving the authentication data 114 generated by the identity management system 140 and transmitted to the mobile device 110, that the user 102 is to be authenticated and provide the user 102 with access to the system 126 through the user device 120. The access to the system 126 is provided through the user device 120, and is dependent on the short range wireless connection 125 existing between the mobile device 110 and the user device 120. If the mobile device 110, and thus the user 102, moves to be physically outside of a proximity to the user device 120 and the short range wireless connection 125 is terminated as a result, the user 102's access to the system 126 will be terminated as well. The access to the system 126 can depend on a variety of factors, such as the amount of time the user 102 has been actively using the system 126, the amount of activity on the mobile device 110, and so on.

Figure 4:
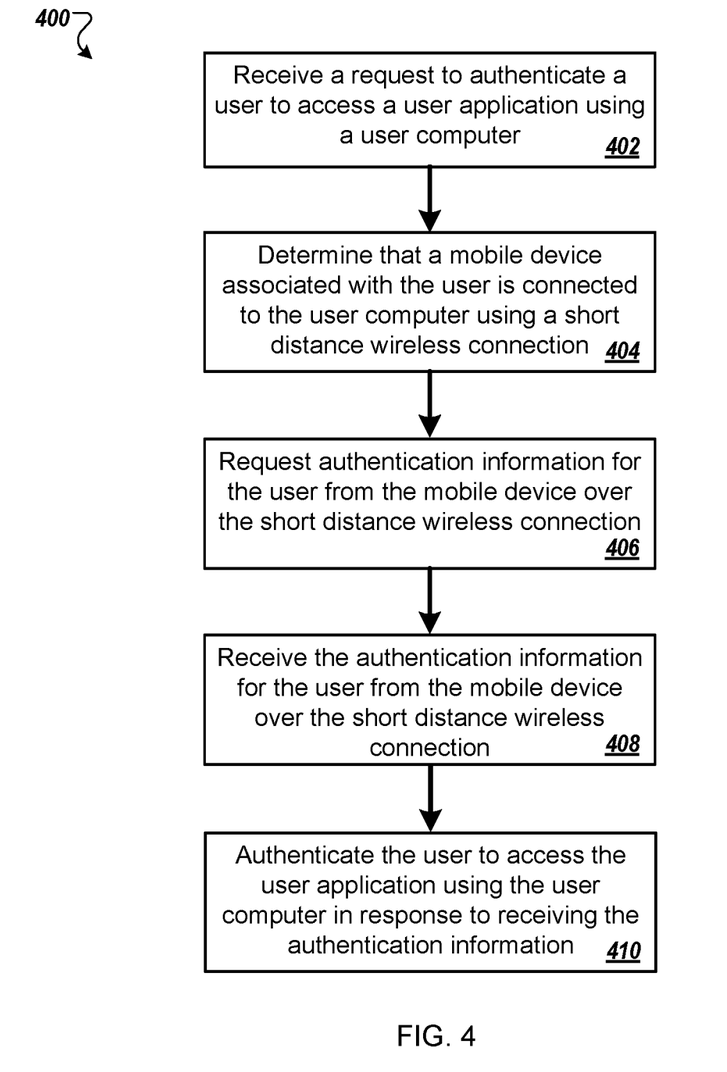
FIG. 4 is a flow chart of an example technique for user authentication.

FIG. 4 shows an example technique 400 for authentication on behalf of a user by the user's mobile device.

At block 402, an identity management application running on the user computer receives a request to authenticate a user to access a user application using the user computer. For example, the user can attempt to access a patient's records through the system on the user device in the patient's room and trigger a request being transmitted to the identity management system, which results in a request for authentication being provided to the identity management application.

At block 404, the identity management application on the user computer determines that a mobile device associated with the user is connected to the user computer 10 using a short distance wireless connection. For example, the mobile device can be in the user's pocket, and thus within range to establish a short range wireless connection, such as a Bluetooth, NFC, etc. connection.

At block 406, the identity management application submits a request to the mobile device for authentication information or the user over the short distance wireless connection. The authentication information can be any appropriate form of credentials that will authenticate the user. In some examples, the requesting of the authentication information from the mobile device triggers an automatic process that causes the mobile device to request authentication information from the identity management system by providing credentials for the user to the identity management system.

At block 408, the identity management application receives the authentication data for the user from the mobile device over the short distance wireless connection 125. In some examples, the identity management system generates an OTP token and transmits the OTP token to the mobile device, which then presents the token to the to the user computer as.

At block 410, the identity management application authenticates the user to access the system through the user computer in response to receiving the authentication data. For example, the identity management application can transmit the authentication data to the identity management system or cause the data be transmitted to the identity management system by another process on the user computer, resulting in the authentication of the user by the identity management system.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a user device executing an identity management application;
   a mobile device associated with a user and configured to communicate with the user device using a short distance wireless connection; and
   a remote identity management system comprising one or more server computers distinct from the user device and the mobile device,
   wherein the identity management application on the user device performs operations comprising:
      receiving a request to authenticate a user to access a user application of the user device,
      requesting authentication information for the user from the mobile device responsive to a challenge received from the remote identity management system,
      receiving the authentication information from the mobile device,
      in response to receiving the authentication information from the mobile device, sending the authentication information to the remote identity management system, and in response to confirmation from the remote identity management system, authenticating the user to access the user application of the user device, wherein the authentication is dependent upon the user device maintaining a short range wireless connection with the mobile device, and
      revoking the authentication to access the user application in response to determining that the mobile device is not in communication with the user device using the short range wireless connection;
   wherein the mobile device, after receipt of the request for the authentication information performs operations comprising:

requesting the authentication information from the remote identity management system, and returning the authentication information to the user device after receipt from the remote identity management system; and wherein the remote identity management system performs operations comprising:

providing the authentication information to the mobile device, and confirming user authentication to the user device based on the authentication information provided to the mobile device and received from the user device.

2. The system of claim 1, wherein in response to a determination that the mobile device is no longer in communication with the user device, the identity management application revokes the authentication of the user to access the user application using the user device.

3. The system of claim 1, wherein the short distance wireless connection is limited to devices that are within a relative proximity of each other.

4. The system of claim 1, wherein requesting the authentication information by the mobile device comprises: providing credentials for the user to the identity management system.

5. The system of claim 4, wherein the remote identity management system, in response to receiving the credentials from the user device, generates the authentication information.

6. The system of claim 1, wherein the user device provides a request for authentication of the user to the identity management system, and in response the identity management system performs operations comprising:

determining that mobile authentication is available for the request to authenticate the user based on an identity management policy, and providing a challenge to the user device for authentication information to be obtained from the mobile device.

7. A method performed by a remote identity management system, the method comprising:

receiving, at the remote identity management system, a request, from a user device distinct from the remote identity management system, to authenticate a user to access a user application;

determining that mobile authentication is available for the request to authenticate the user based on an identity management policy;

providing, by the remote identity management system, a challenge to the user device for authentication information to be obtained by the user device from a mobile device associated with the user and distinct from the user device;

receiving, at the remote identity management system, user credentials from the mobile device responsive to the challenge provided to the user device;

in response to receiving the user credentials, providing authentication information to the mobile device;

receiving the authentication information provided to the mobile device from the user device in response to the challenge; and confirming authentication of the user allowing the user to access the user application from the user device, wherein the authentication is dependent upon the user device maintaining a short range wireless connection with the mobile device such that the user device revokes the authentication to access the user application in response to determining that the mobile device is not in communication with the user device using the short range wireless connection.

8. The method of claim 7, wherein the authentication information provided to the mobile device is single use authentication information.

9. The method of claim 7, wherein providing the authentication information to the mobile device includes verifying the received user credentials.

10. The method of claim 7, wherein providing the authentication information comprises generating a security token storing one or more of cryptographic keys, or a digital signature.

11. The method of claim 7, wherein determining that mobile authentication is available comprises accessing an identity management policy to determine whether authentication through a mobile device is permitted.

12. The method of claim 7, wherein the challenge is transmitted to a browser of the user device, the challenge comprising an HTML challenge for a security token.

13. One or more non-transitory computer readable media storing instructions that when executed by one or more computers cause the a remote identity management system of one or more computers to perform operations comprising:

receiving, at the remote identity management system, a request, from a user device distinct from the remote identity management system to authenticate a user to access a user application;

determining that mobile authentication is available for the request to authenticate the user based on an identity management policy;

providing, by the remote identity management system, a challenge to the user device for authentication information to be obtained by the user device from a mobile device associated with the user and distinct from the user device;

receiving, at the remote identity management system, user credentials from the mobile device responsive to the challenge provided to the user device;

in response to receiving the user credentials, providing authentication information to the mobile device;

receiving the authentication information provided to the mobile device from the user device in response to the challenge; and confirming authentication of the user allowing the user to access the user application from the user device, wherein the authentication is dependent upon the user device maintaining a short range wireless connection with the mobile device such that the user device revokes the authentication to access the user application in response to determining that the mobile device is not in communication with the user device using the short range wireless connection.

14. The one or more non-transitory computer readable media of claim 13, wherein the authentication information provided to the mobile device is single use authentication information.

15. The one or more non-transitory computer readable media of claim 13, wherein providing the authentication information to the mobile device includes verifying the received user credentials.

16. The one or more non-transitory computer readable media of claim 13, wherein providing the authentication information comprises generating a security token storing one or more of cryptographic keys, or a digital signature.

17. The one or more non-transitory computer readable media of claim 13, wherein determining that mobile authentication is available comprises accessing an identity management policy to determine whether authentication through a mobile device is permitted.

18. The one or more non-transitory computer readable media of claim 13, wherein the challenge is transmitted to a browser of the user device, the challenge comprising an HTML challenge for a security token.

* * * * *